March 14, 1950     L. P. WINBY     2,500,909
PIPE COUPLING
Filed Nov. 20, 1946

INVENTOR:
LEWIS PHILLIPS WINBY
BY:
ATTORNEY

Patented Mar. 14, 1950

2,500,909

UNITED STATES PATENT OFFICE 2,500,909

PIPE COUPLING

Lewis Phillips Winby, London, England, assignor to High-Pressure Components Limited, London, England Application November 20, 1946, Serial No. 710,987
In Great Britain January 25, 1946

1 Claim. (Cl. 285—86)

The pipe coupling forming the subject of the present invention is intended primarily for use with metal pipes, although it is also suitable for use with pipes composed of other materials, the coupling being suitable where it is desired to connect together two pipes in end-to-end relationship, or where it is desired to connect a pipe to a container or other fitting. The coupling is in certain respects similar in construction to the coupling forming the subject of Patent No. 564,515, of which the applicant company are patentees.

A pipe coupling in accordance with the present invention comprises an externally screwthreaded union or body member having a tapering extremity adapted to enter the end of the pipe which has previously been outwardly flared to receive it, the tapering part of the union having one or more annular recesses formed in its surface, an internally screw-threaded sleeve nut in threaded connection with the union and having one end internally tapered to enclose the flared end of the pipe, and a truncated cone shaped collet interposed between the flared end of the pipe and the internally-tapered part of the nut, the collet being split or otherwise formed so as to be capable of contraction on to the pipe as a result of tightening the nut on the union.

It is intended that the union shall be composed of a metal substantially harder than the material of the pipe so that the comparatively sharp edges of the recess or recesses will, as a result of the clamping action of the collet and nut when the latter is tightened form on the inner surface of the tapered end of the pipe an annular ridge or ridges, which will seat in the annular recess or recesses in the surface of the union, thereby providing a good seal between the pipe and the union member.

Although it is within the scope of the present invention to employ a truncated cone shaped collet which is split longitudinally or diagonally at two or more points so that it is divided into two or more segments, it is generally sufficient to split the collet at one point only, the split or splits being more or less closed when the sleeve nut is fully tightened.

Furthermore, it is preferred that the truncated cone-shaped collet shall include a parallel-sided extension which embraces the pipe adjacent its flared end.

In the case of a truncated cone of uniform thickness, the taper on the nut will correspond to that on the pipe, the edge of the sleeve nut contacting the cone at the intersection of its tapered and parallel-sided parts.

In order that the invention may be clearly understood and readily carried into effect the invention is hereinafter described with reference to the accompanying drawings wherein.

Figures 1, 2, 3:
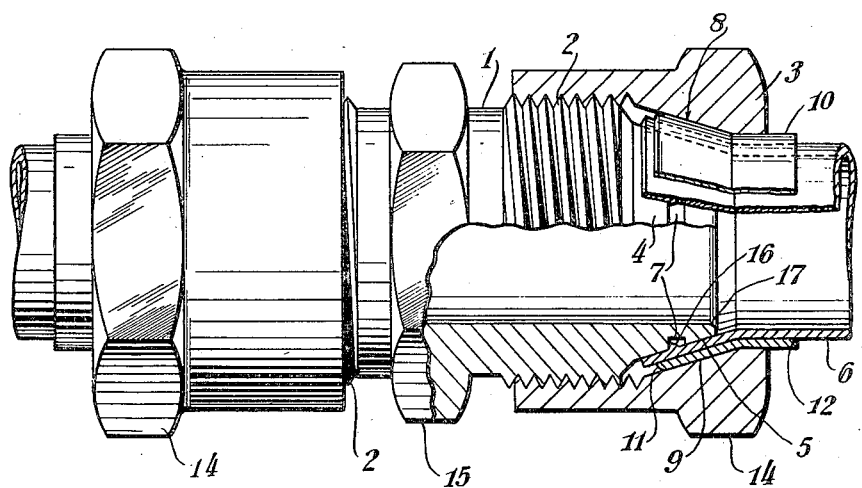
Figure 1 is a fragmentary longitudinal section of a pipe coupling constructed in accordance with the present invention.
Figures 2 and 3 are respectively a longitudinal section and end elevation of the preferred form of truncated cone-shaped collet.

The pipe coupling shown in Figure 1 is designed to connect together two pipes in end-to-end relationship the extremities of the pipes having been previously flared outwardly to receive the extremities of the body of the coupling. The body of the coupling is indicated generally by reference numeral 1, the body being externally screwthreaded at its opposite ends at 2 to receive sleeve nuts 3. The extremities of the body are externally coned at 4 to receive the correspondingly flared parts 5 of the pipes 6 the surface of each coned part 4 being formed with an annular straight sided recess 7. Each sleeve nut 3 is internally coned at 8, the angle of taper corresponding to the angle of taper of the surfaces 4. A collet formed of steel or other suitable material is interposed between the pipe and the coned surface of the sleeve nut, the general shape of the collet being shown clearly in Figures 2 and 3. The collet includes a conical part 9 and a cylindrical part 10 the opposite extremities of the collet being externally and internally radiused respectively at points 11 and 12. The collet is split longitudinally at 13 the collet and split being preferably so dimensioned that the split will be substantially closed when the sleeve nut is fully tightened.

Each sleeve nut is formed with flats 14 of hexagonal or other formation for the reception of a spanner, the body at its mid point being likewise formed with corresponding flats 15.

It will be appreciated that each joint is made by first engaging the flared extremity of the pipe with the tapering end of the union or body, the sleeve nut and collet having previously been placed on the pipe, and moved up into a position in which the collect engages the flared part of the pipe and the sleeve nut is capable of engaging the screwthreads on the union. The action of tightening-up the sleeve nut will then not only contract the collet into firm engagement with the pipe, and thereby force the pipe into intimate contact with the conical end of the union, but will tend to force the tapering mouth of the pipe still further up the conical end of the union, at the same time forming on the inner surface of the tapering part of the pipe the annular ridge or ridges above referred to, the annular ridge formed with the coupling shown being indicated by reference numeral 16 but being of exaggerated depth for the purpose of illustration.

The collet has the effect of preventing loosening of the joint under the action of vibration, and at the same time assists in preventing any tendency for the pipe to rotate as a result of tightening-up the nut.

The collet may be composed of any suitable metal or material, and may be produced in the form of segmental-shaped stampings or pressings as distinct from the unitary construction shown, or manufactured in any other suitable way.

The extremities of the collet being externally and internally radiused do not tend to damage the internal conical face of the sleeve nut and external surface of the pipe under the tightening action of the sleeve nut and consequently the collet is free to move into intimate contact with the external surface of the flared part of the pipe. Furthermore, although the edges of the annular recess produce a ridge on the internal surface of the pipe the joint can be broken when necessary and re-made without in any way affecting its fluid tightness.

The internal diameter of the union or body corresponds substantially to the internal diameter of the pipe so as not to interfere to any material extent with the free flow of fluid through the coupling, the body being internally radiused at its extremities at 17 for the same purpose.

It will be appreciated that in the case of the application of the invention to a coupling intended for use in connecting a pipe to a vessel or fitting that the body may, if desired, form an integral part of the vessel or fitting in which case the body will be threaded and coned at one end only and will carry only one sleeve nut.

What I claim is:

A pipe coupling comprising an externally screw-threaded union having an extremity tapered to enter and fit the outwardly flared end of a pipe, the tapered extremity of said union having an annular recess formed in its surface, said recess being of straight sided formation to form a cutting edge to cut a seating in the inner surface of the flared end of the pipe, an internally screw-threaded sleeve nut in threaded connection with the union having one end internally tapered to enclose the flared end of the pipe, the angle of taper of the sleeve nut corresponding with the angle of taper of the union and flared end of the pipe, and a truncated cone-shaped collet interposed between the flared outer surface of the pipe and the internally tapered part of the sleeve nut, said collet being split longitudinally throughout its length so as to be capable of contraction on to the pipe as a result of tightening the sleeve nut on the union and being so dimensioned that the gap formed by splitting the collet is substantially closed when the sleeve nut is fully tightened.

LEWIS PHILLIPS WINBY.

REFERENCES CITED

The following references are of record in the file of this patent:

UNITED STATES PATENTS

| Number | Name | Date |
|---|---|---|
| 1,327,106 | Leahy | Jan. 6, 1920 |
| 1,789,079 | Simpson et al. | Jan. 13, 1931 |
| 2,189,566 | Kreidel | Feb. 6, 1940 |
| 2,289,382 | Parker | July 14, 1942 |
| 2,354,460 | Hillis | July 25, 1944 |
| 2,444,622 | Wolfram | July 16, 1948 |